United States Patent [19]

Bischof et al.

[11] Patent Number: 5,072,804
[45] Date of Patent: Dec. 17, 1991

[54] POWER-ASSISTED STEERING SYSTEM

[75] Inventors: Hubert Bischof, Vaihingen/Enz; Ulrich-Eugen Konigorski, Möglingen; Uwe Kirberg, Markgröningen-Unterriexingen, all of Fed. Rep. of Germany

[73] Assignee: Robert Bosch GmbH, Stuttgart, Fed. Rep. of Germany

[21] Appl. No.: 577,276

[22] Filed: Sep. 4, 1990

[30] Foreign Application Priority Data

Sep. 2, 1989 [DE] Fed. Rep. of Germany ....... 3929176

[51] Int. Cl.$^5$ ............................................. B62D 5/04
[52] U.S. Cl. ..................................... 180/142; 180/79.1
[58] Field of Search ...................... 180/79.1, 142, 141, 180/143

[56] References Cited

U.S. PATENT DOCUMENTS

| | | | |
|---|---|---|---|
| 4,621,327 | 11/1986 | Dolph et al. | 180/79.1 X |
| 4,681,183 | 7/1987 | Oshita | 180/79.1 |
| 4,800,974 | 1/1989 | Wand et al. | 180/142 X |
| 4,834,203 | 5/1989 | Takahashi et al. | 180/79.1 |
| 4,869,333 | 9/1989 | Morishita et al. | 180/79.1 |
| 4,957,181 | 9/1990 | Oshita et al. | 180/79.1 |

FOREIGN PATENT DOCUMENTS 163864 7/1987 Japan .................................. 180/79.1

Primary Examiner—Charles A. Marmor
Assistant Examiner—Alan M. Kagen
Attorney, Agent, or Firm—Walter Ottensen

[57] ABSTRACT

A power-assisted steering system for a vehicle such as an automobile or truck and having an electro-mechanical servo drive. The servo drive directs the wheels to be steered which are journalled on a wheel carrier assembly and coacts with a steering wheel of the vehicle. The steering system includes a controller to which a steering wheel torque and a steering torque are supplied for forming a control difference with the steering wheel torque being generated by the driver when steering. The steering torque is the actuating torque occurring between the servo drive and the wheel carrier and the forces developed on the steering wheel are controlled to pregiven values while considering the mechanical reaction.

15 Claims, 2 Drawing Sheets

POWER-ASSISTED STEERING SYSTEM

FIELD OF THE INVENTION

The invention relates to a power-assisted steering system for vehicles such as an automobile and truck and having an electro-mechanical servo drive. The servo drive operatively connected to the wheels to be steered which are mounted on a wheel carrier assembly. The servo drive coacts with the steering wheel of the vehicle.

BACKGROUND OF THE INVENTION

In the construction of vehicles, it is known to keep the steering forces low even with a small ratio (that is, few steering wheel rotations) in that power-assisted steering is utilized. In a power-assisted steering system equipped with an electro-mechanical servo drive, the auxiliary forces acting on the wheel carrier assembly are developed by an electric motor (servo motor).

The known electro-mechanical power-assisted steering systems operate in accordance with the principle of power amplification; that is, a steering wheel torque developed at the steering wheel of the vehicle is amplified by the electro-mechanical servo drive and transmitted to the wheel carrier assembly. These power-assisted steering systems often have the disadvantage that they do not provide the driver with a good contact to the roadway via the steering wheel and also are inclined to vibration. In addition, no satisfactory self-acting return movement of the steered wheels into the straight-ahead running position takes place. The last-mentioned disadvantage is produced by the stress conditions caused by friction between the servo motor with transmission and the wheel/roadway contact.

SUMMARY OF THE INVENTION

In contrast to steering systems of the kind described above, the power-assisted steering system of the invention affords the advantage that it has low vibration, a direct steering performance which can be sensed and has perfect return movement characteristics. According to a feature of the invention, a controller is provided to which a steering wheel torque and a steering torque are supplied to form a control difference with the steering wheel torque being developed by the driver when steering. The steering torque corresponds to the actuating torque between the servo drive and the wheel carrier assembly.

In the prior art, a steering wheel torque applied to the steering wheel is only amplified and transmitted to the wheel carrier assembly. In contrast thereto, the power-assisted steering system of the invention provides a control of the forces developed at the steering wheel. This takes place in that the steering torque detected by an appropriate sensor is applied when forming the control difference. Mechanical reaction forces in the form of force occurring at the wheels to be steered penetrate mechanically to the steering wheel. Via these forces, the driver is provided with a correspondingly lesser predeterminable evaluated torque at the steering wheel in dependence upon the magnitude of the particular instantaneous steering torque present.

In view of the above, the invention is based upon a completely new point of view, namely, looking from the roadway to the steering wheel. The force flow direction is here understood to be from the wheels to be steered to the steering wheel. In this way, the force felt at the steering wheel is controlled in dependence upon the steering torque.

A steering movement undertaken at the steering wheel by the driver of the vehicle must be pictured with respect to the force flow as follows. This steering movement leads to a torsion torque between the servo system and the wheel carrier assembly on which the wheels are mounted. This leads to a servo motor supported turning of the wheels with the principle of the invention of "from bottom to top", the forces acting on the steering wheel are always held to desired predeterminable values. Accordingly, "lower" acting forces or torques (for example from a bump in the roadway) are always transmitted in corresponding attenuated form to the driver via the steering wheel. In the power-assisted steering systems of the state of the art, said all changes of the steering wheel torque result in large changes of the steering torque in accordance with the power amplification principle of "top to bottom". This is associated with a considerable inclination toward vibration. In contrast, the power-assisted steering system of the invention applies the steering torque itself to form the control difference; that is, with the invention, the vibrations are avoided ab initio by appropriate compensation.

According to another feature of the invention, the values for the steering wheel torque are influenced in dependence upon the vehicle condition and/or driving condition by means of a set of characteristic curves and/or an algorithm of a weighting circuit. The influencing values which can be used here include: vehicle road speed, yaw velocity, yaw acceleration and the loading.

The steering wheel torque to be developed by the driver when steering (that is when entering a curve) forms an actual value and the steering torque forms a desired value for the controller. Opposite conditions are present for the self-acting return movement of the steering (that is when leaving a curve to travel straight ahead). In this case, the steering torque forms the actual value and the steering wheel torque forms the desired value for the controller. In this way, an excellent return movement performance is obtained. Control deviations present in conventional arrangements because of the above-mentioned stress conditions are not present in the power-assisted steering system of the invention.

Preferably, the steering torque is applied to the weighting circuit as an input variable. The weighting circuit supplies an output variable in the form of a characteristic torque which is supplied to a summing point for forming the control difference. The output variable is preferably applied with a negative polarity sign. The steering wheel torque can be made adjustable in wide ranges by means of the set of characteristic curves and/or the algorithm of the weighting circuit in dependence upon the steering torque and, in this way, also individually adapt to the driver desire in addition to the dependence upon the above-mentioned influence variables. For female drivers, a correspondingly lesser steering wheel torque can be adjusted than for male drivers.

It is advantageous to provide a damping circuit which supplies a damping torque to the summing point which influences the control difference. The damping torque can be dependent from the steering torque and/or the steering speed and/or the vehicle speed. The actuating direction of the steering can be detected via the steering torque with different damping values being provided in accordance with the actuating direction. Actuating direction of the steering is here intended to be the turning of the wheels; that is, from straight-line travel to a turning of the wheels; and, the return of the wheels from the curve travel to straight-ahead travel. The steering speed is the speed with which the driver rotates the steering wheel (rotational angle per unit of time) or, with the return movement, the speed with which the wheels return to the straight-ahead travel position.

A further embodiment of the invention includes a dynamic controller which is connected in parallel with the controller described above (characteristic curve controller) and to which steering wheel torque and steering torque are applied as input variables. This dynamic controller has the task of eliminating dynamic disturbances (gear transmission harmonics) of the gear transmission connected between the servo motor and the wheel carrier assembly; whereas, the characteristic curve controller guarantees the static retainment of the set of characteristic curves of the weighting circuit. Furthermore, the dynamic controller improves the inherent dynamic of the system in that it attenuates the dominant natural frequency.

A secondary servo motor speed controller is provided to eliminate the moment of inertia of the motor. Furthermore, static friction and sliding friction effects of the servo motor are reduced in this way in the sense of a positive steering feel so that the driver no longer senses these effects.

According to a preferred embodiment of the invention, a linear circuit is connected downstream of the servo motor speed controller. The linearization circuit compensates for nonlinearities between the circuit arrangement and the servo motor. The servo motor can be driven by an actuator which has nonlinearities and a suitable actuator is preferably a controllable semiconductor component.

The actuator can advantageously be configured as a current control loop.

Finally, the servo drive utilized can operate hydraulically and serve as an alternate to the electro-mechanical servo drive.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
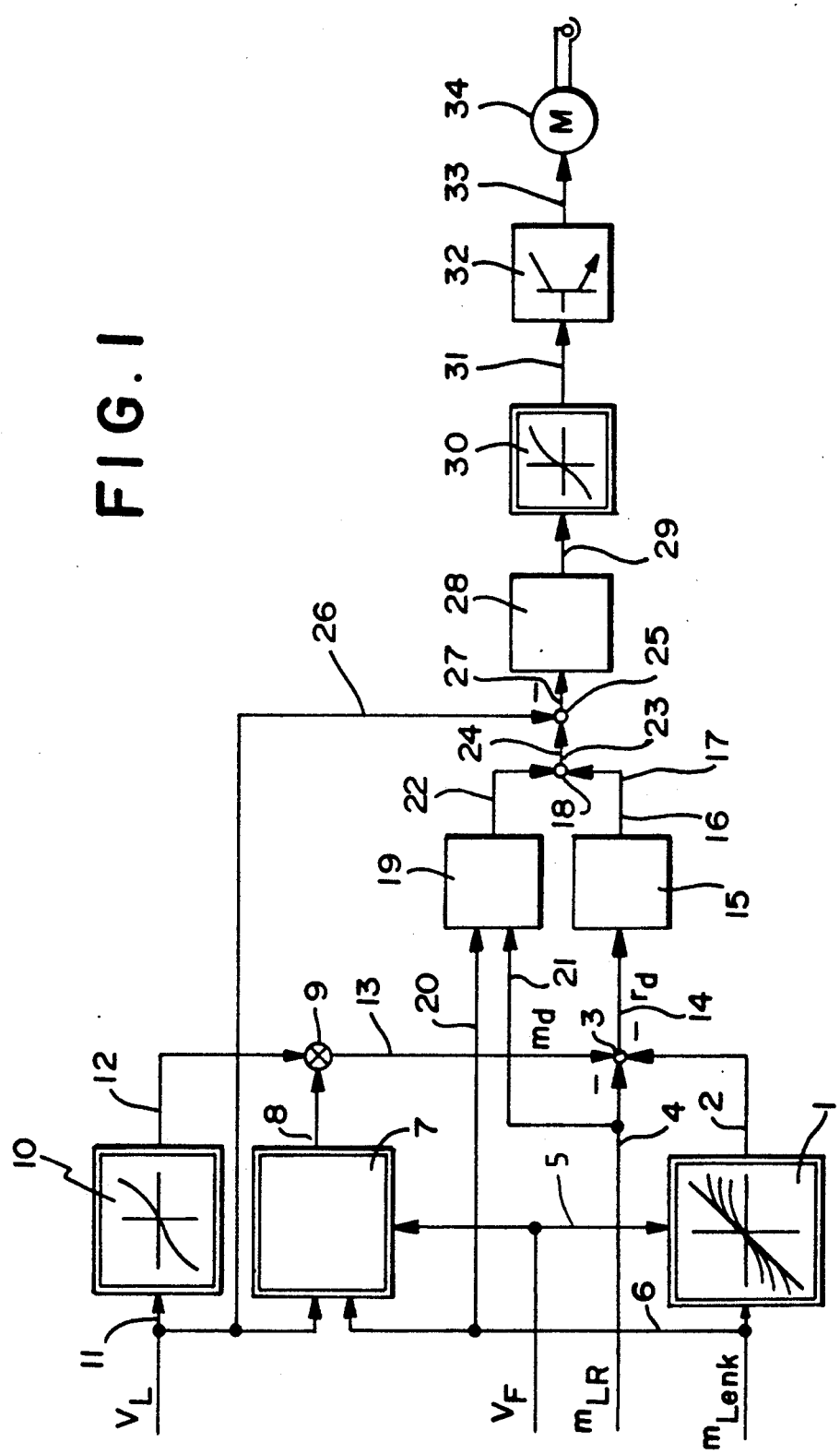
FIG. 1 is a circuit block diagram of the power-assisted steering system according to the invention; and, FIG. 2 is a diagram showing the dependence of the steering wheel torque on the steering torque.

In the circuit block diagram of FIG. 1, a steering torque $m_{Lenk}$ is supplied by a sensor (not illustrated) to a weighting circuit 1. The output 2 of the weighting circuit 1 is connected to a summing point 3. The output variable of the weighting circuit 1 is applied to the summing point 3 with a negative polarity sign. The steering wheel torque $m_{LR}$ is developed by the driver of the vehicle when steering with the steering wheel with the vehicle being equipped with the power-assisted steering system of the invention. This steering wheel torque $m_{LR}$ is likewise supplied to the summing point 3 and is transmitted via line 4. A suitable sensor (not shown) detects the road speed $v_F$ of the vehicle and supplies the same via a line 5 to the weighting circuit 1.

The steering torque $m_{Lenk}$ is applied via a line 6 to the input of a damping circuit 7. The damping circuit 7 is connected with line 5 so that the road speed $v_F$ is supplied.

Finally, a further sensor is provided on the steering column and detects the steering speed occurring when the steering returns. This sensor detects the steering speed $v_L$ (rotational angle per unit of time) and supplies corresponding data to a further input of the damping circuit 7. The output 8 of the damping circuit 7 leads to a multiplier point 9.

In addition, a characteristic curve circuit 10 is provided which receives the steering speed $v_L$ as an input variable 11 and has an output 12 which is connected with the multiplier point 9. The output 13 of the multiplier point 9 supplies a damping moment $m_d$ and is connected to summing point 3 with the same sign as the output 2 of the evaluation circuit 1.

A controller 15 (characteristic curve controller) is connected to the output 14 of the summing point 3. The controller 15 is supplied with a control difference $r_d$ from the output 14 of the summing point 3. The output 16 of the controller 15 is connected via a line 17 with a summing point 18.

A dynamic controller 19 is provided which receives steering torque $m_{Lenk}$ as the first input variable via a line 20 and the steering wheel torque $m_{LR}$ as the second input variable via line 21. The output 22 of the dynamic controller 19 is connected to the summing point 18 as a further input variable. The output 23 of the summing point 18 is connected to an input 24 of a further summing point 25. The steering speed $v_L$ is also supplied to the summing point 24 with a negative polarity sign. This takes place via a line 26.

The output 27 of the summing point 25 is connected to a secondary servo motor speed controller 28. The output 29 of speed controller 28 is supplied to a linearization circuit 30. The output 31 of the linearization circuit 30 is connected to an actuator 32 having controllable semiconductor components. These components control a servo motor 34 via the output 33 of the actuator 32. As mentioned, the servo motor 34 loads the wheel carrier assembly (not shown) via an appropriate steering transmission. A current control loop (not shown) is subordinated to the actuator 32.

The operation of the power-assisted steering system of the invention will now be described.

If control differences $r_d$ occur because of the steering movements of the operator and/or the driving condition of the vehicle, then these values are detected by the controller 15 which forms a corresponding output signal at its output 16. This output signal then passes through the summing point 18 and is applied to the summing point 25. The output variable of the controller 15 is supplied to the servo motor speed controller 28 irrespective of further possible influencing variables such as steering speed $v_L$ and the output value of the dynamic controller 18. The output variable of the controller 28 eliminates the motor moment of inertia of the servo motor 34 which is always present. Likewise, static friction and sliding friction effects of the servo motor 34 are reduced. The output value 29 of the servo motor speed controller 28 reaches the linearization circuit 30 which considers nonlinearities especially of the actuator 32 connected downstream by means of an appropriate characteristic or also by means of an algorithm. The actuator 32 is driven via output 31 in such a manner that the actuator displaces the servo motor 34 so that the above-mentioned control difference $r_d$ is controlled to zero.

The control difference $r_d$ is composed of the difference of the steering wheel torque $m_{LR}$ and the steering torque $m_{Lenk}$ and this is without consideration of the damping torque $m_d$. The steering torque $m_{Lenk}$ is evaluated by the evaluation circuit 1. The evaluation circuit 1 includes a set of characteristic curves or an algorithm which is dependent upon the vehicle condition and/or the driving condition of the vehicle. The loading of the vehicle is viewed, for example, as a factor which depends upon vehicle condition. In the embodiment illustrated, a dependency of the driving condition of the vehicle is shown and the value of the road speed $v_F$ of the vehicle supplied at the output 2 of the evaluation circuit 1 is influenced (the road speed $v_F$ is supplied via the line 5).

FIG. 1 shows that the control difference $r_d$ is charged with the damping torque $m_d$. The damping torque $m_d$ is generated by utilizing the damping circuit 7 and the characteristic curve circuit 10 as well as the multiplier point 9. The damping circuit 7 generates a corresponding damping value in dependence upon the steering speed $v_L$, the steering torque $m_{Lenk}$ and the road speed $v_F$. In addition, the steering speed $v_L$ is weighted by means of the characteristic curve circuit 10. The weighting can, for example, be linear, progressive or degressive. The output values of the characteristic curve circuit 10 and the damping circuit 7 are multiplied at the multiplier point 9 and then supplied as a result (damping moment $m_d$) to the summing point 3 as a further input variable. An influence with respect to the actuating direction of the steering takes place by supplying the steering torque $m_{Lenk}$ to the damping circuit 7. This means that the damping value can be adjusted in dependence upon whether the steering is actuated from a straight-ahead travel into a curve travel or from a curve travel into a straight-ahead travel.

The dynamic controller 19 is provided to rapidly detect and correct dynamic influences in the case of a disturbance. The dynamic controller 19 especially eliminates disturbing transmission harmonics of the steering transmission. Furthermore, the dynamic controller 19 attenuates the dominating natural frequency of the system.

The power-assisted steering system of the invention has excellent return characteristics. For the return movement which takes place automatically after travelling in a curve, it is assumed that the driver releases the steering wheel. In this case, the steering wheel torque $m_{LR}$ takes on the value "zero". The steering wheel torque $m_{LR}$ forms the desired value and the steering torque $m_{Lenk}$ forms the actual value when returning. For this reason, the steering torque $m_{Lenk}$ tends to take on the value "zero" since during a control, the actual value always seeks to assume the value of the desired value. For this reason, the steering torque $m_{Lenk}$ likewise adjusts to the value "zero"; that is, the straight-ahead travel of the vehicle then takes place.

Reversed conditions then take place for a steering operation of the driver. The driver supplies a specific steering wheel torque $m_{LR}$ as the actual value to which the steering torque $m_{Lenk}$ first adapts during the control phase as a desired value which first deviates therefrom.

The steering torques $m_{Lenk}$ occurring in the power-assisted servo system of the invention are corrected. For this reason, the corresponding forces on the steering wheel are adjusted via the mechanical reaction to the steering wheel, the forces occurring on the steering wheel can be adjusted to desired predetermined values in accordance with the characteristic configuration or algorithm configuration as well as other influences. It is also possible to make individual adjustments for drivers. The forces to be developed at the steering wheel can be adjusted so as to be lower for a female driver than for a male driver.

Figure 2:
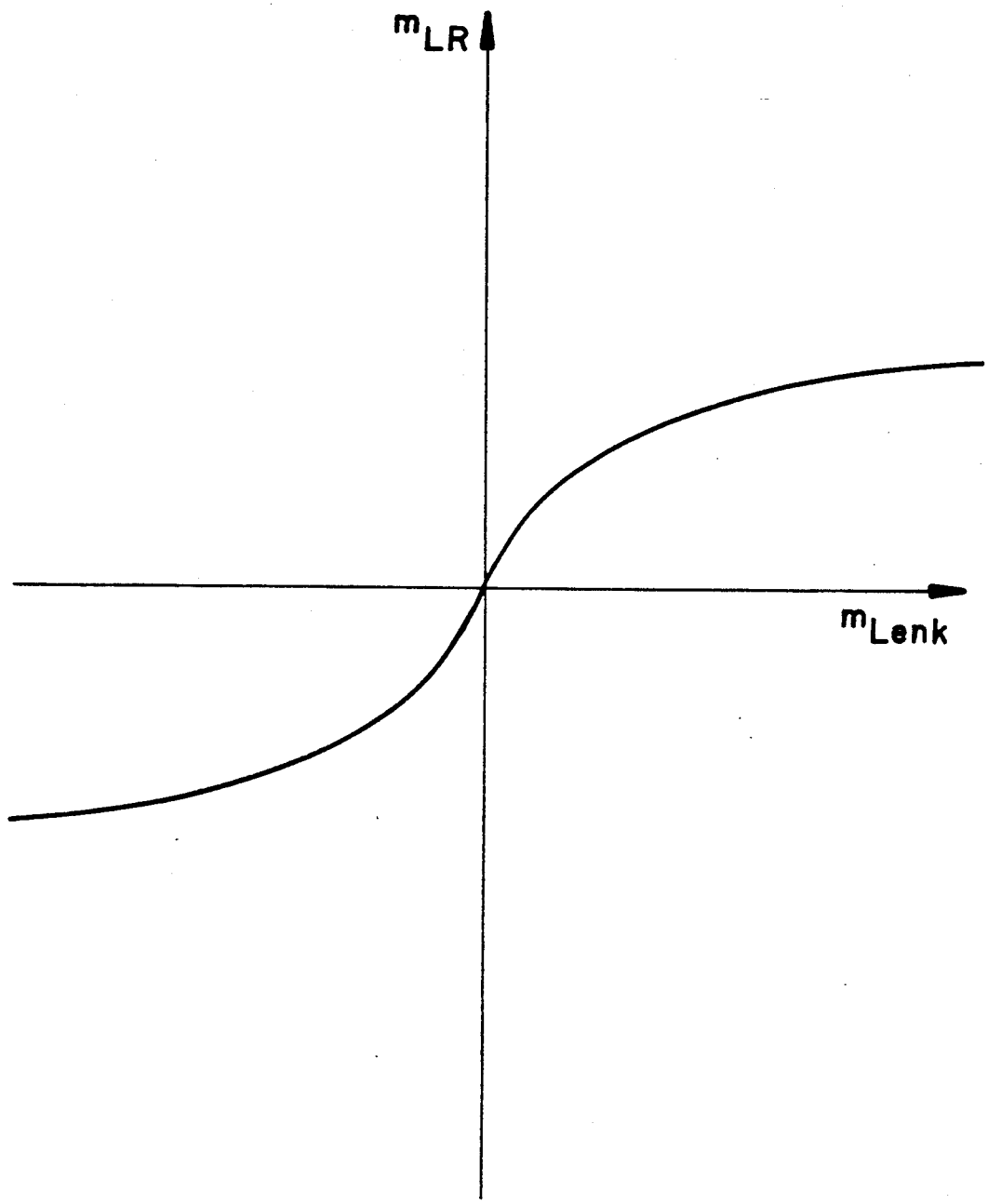

Furthermore, an excellent damping of vibrations is provided by the steering system of the invention. In prior art devices, the amplification of the steering wheel force leads to large changes of the steering torque even for small changes of the steering wheel torque which is always associated with a tendency toward vibration. In contrast, the steering system of the invention provides for a relatively small change of the steering wheel torque $m_{LR}$ (y-axis) for a change in the steering torque $m_{Lenk}$ (x-axis) as shown in FIG. 2 since the characteristic shows a degressive course. A system having a low vibration is provided with the control principle of the invention.

The solution according to the invention is characterized by a special type of characteristic curve processing for the damping and the support of the auxiliary force. A separation of the disturbance performance and of the guiding performance of the control by means of the dynamic controller and the characteristic curve controller 15 is provided. Adjustments of the guiding and disturbance performances can be adjusted substantially independently.

As explained above, the moment of inertia of the motor is eliminated by the servo motor speed controller 28. A performance free of vibration is assured since neither inertia effects nor static friction effects from the servo motor 34 as well as its transmission occur. The damping can be influenced in dependence upon rotational direction or actuating direction by means of applying the steering torque $m_{Lenk}$ to the damping circuit 7. Furthermore, ideal steering force limiting characteristics are provided by means of the evaluation circuit 1. A dynamic intervention is provided because of the damping dependent upon the steering speed $v_L$. A static variation of the steering assistance is provided by considering the road speed $v_F$. The power-assisted steering system operating according to the inventive control principle makes possible a vibration-free, direct steering performance.

It is understood that the foregoing description is that of the preferred embodiments of the invention and that various changes and modifications may be made thereto without departing from the spirit and scope of the invention as defined in the appended claims.

What is claimed is:

1. A power-assisted steering system for a motor vehicle such as an automobile and truck for travel over a roadway, the vehicle including a wheel carrier assembly having wheels rotatably journalled thereon and a steering wheel assembly having a steering wheel on which forces act and to which a driver of the vehicle applies a steering wheel torque ($m_{LR}$) when manipulating the steering wheel assembly for steering the vehicle, the wheels being subjected to mechanical reaction from the roadway travelled on by the vehicle, the power-assisted steering system comprising:

a servo drive operatively connected to said wheel carrier assembly for articulating said wheels whereby an actuating torque ($m_{Lenk}$) is developed between said servo drive and said wheel carrier assembly;

steering wheel torque supply means for supplying a first signal indicative of the steering wheel torque ($m_{LR}$);

actuating torque ($m_{Lenk}$) supply means for supplying a second signal indicative of said actuating torque ($m_{Lenk}$); and, controller means receiving said first and second signals to form a control difference ($r_d$) and for controlling said forces acting on said steering wheel to predetermined values while considering the mechanical reaction from the roadway.

2. The power-assisted steering system of claim 1, wherein the values for the steering wheel torque ($m_{LR}$) are influenced in dependence upon road and driving conditions by means of a set of characteristic curves.

3. The power-assisted steering system of claim 1, wherein the values of the steering wheel torque ($m_{LR}$) are influenced in dependence upon vehicle and road conditions by means of an algorithm of an evaluating circuit.

4. The power-assisted steering system of claim 1, wherein said steering wheel torque ($m_{LR}$) defines an actual value for said controller means and said actuating torque ($m_{Lenk}$) defines a desired value for said controller means.

5. The power-assisted steering system of claim 1, wherein the actuating torque ($m_{Lenk}$) defines an actual value and the steering wheel torque ($m_{LR}$) defines a desired value for said controller means for a self-acting return movement of the wheel carrier assembly.

6. The power-assisted steering system of claim 1, wherein the vehicle travels at a road speed ($V_F$) along the roadway; and, an evaluation circuit is connected upstream of said controller means and said evaluation circuit being influenced by the road speed ($V_F$) of the vehicle.

7. The power-assisted steering system of claim 1, further comprising a dynamic controller connected in parallel to said controller means; said first and second signals being applied to said dynamic controller as respective input variables.

8. The power-assisted steering system of claim 1, said servo drive including a servo motor having a moment of inertia and said system further comprising a secondary servo motor speed controller for eliminating the moment of inertia of the servo motor.

9. The power-assisted steering system of claim 8, further comprising a linearization circuit connected downstream of said secondary servo motor speed controller.

10. The power-assisted steering system of claim 9, further comprising an actuator for driving said servo motor; and, said actuator including a current control loop.

11. The power-assisted steering system of claim 1, said servo drive being hydraulic.

12. The power-assisted steering system of claim 1, said servo drive being electro-mechanical.

13. A power-assisted steering system for a motor vehicle such as an automobile and truck for travel over a roadway, the vehicle including a wheel carrier assembly having wheels rotatably journalled thereon and a steering wheel assembly having a steering wheel on which forces act and to which a driver of the vehicle applies a steering wheel torque ($m_{LR}$) when manipulating the steering wheel assembly for steering the vehicle, the wheels being subjected to mechanical reaction from the roadway travelled on by the vehicle, the power-assisted steering system comprising:

a servo drive operatively connected to said wheel carrier assembly for articulating said wheels whereby an actuating torque ($m_{Lenk}$) is developed between said servo drive and said wheel carrier assembly;

steering wheel torque supply means for supplying a first signal indicative of the steering wheel torque ($m_{LR}$);

actuating torque ($m_{Lenk}$) supply means for supplying a second signal indicative of said actuating torque ($m_{Lenk}$);

controller means receiving said first and second signals to form a control difference ($r_d$) and for controlling said forces acting on said steering wheel to predetermined values while considering the mechanical reaction from the roadway;

a summing point connected to the input of said controller means;

an evaluation circuit connected to said summing point; and, said second signal being applied as an input to said evaluation circuit and said evaluation circuit being configured to supply a characteristic torque as an output variable to said summing point to form said control difference ($r_d$).

14. The power-assisted steering system of claim 13, further comprising damping circuit means for supplying a damping torque ($m_d$) to said summing point for influencing said control difference ($r_d$).

15. The power-assisted steering system of claim 14, wherein at least one of the following are applied to said damping circuit means for influencing said damping torque ($m_d$); said actuating torque ($m_{Lenk}$), said steering velocity ($L$) and said road speed ($F$).

* * * * *

UNITED STATES PATENT AND TRADEMARK OFFICE
CERTIFICATE OF CORRECTION

PATENT NO. : 5,072,804

DATED : December 17, 1991

INVENTOR(S) : Hubert Bischof, Ulrich-Eugen Konigorski and Uwe Kirberg

It is certified that error appears in the above-identified patent and that said Letters Patent is hereby corrected as shown below:

On the title page, under "Attorney, Agent, or Firm": delete "Walter Ottensen" and substitute -- Walter Ottesen -- therefor.

In column 6, line 1: delete ", the" and substitute -- . The -- therefor. (2nd Occurrence)

In column 6, line 2: delete "predetermined" and substitute -- predeterminable -- therefor.

In column 8, line 52: delete ";" and substitute -- : -- therefor.

In column 8, line 53: delete "($_L$)" and substitute -- ($v_L$) -- therefor.

In column 8, line 53: delete "($_F$)" and substitute -- ($v_F$) -- therefor.

Signed and Sealed this

Eleventh Day of May, 1993

Attest:

MICHAEL K. KIRK

Attesting Officer

Acting Commissioner of Patents and Trademarks